Sept. 20, 1955     W. C. FISK     2,718,015
FOLDING PENTHOUSE FOR USE ON THE TOP OF AN AUTOMOBILE
Filed Nov. 28, 1950     2 Sheets-Sheet 1

INVENTOR.
Willard C. Fisk
BY
Fred C. Matheny
ATTORNEY

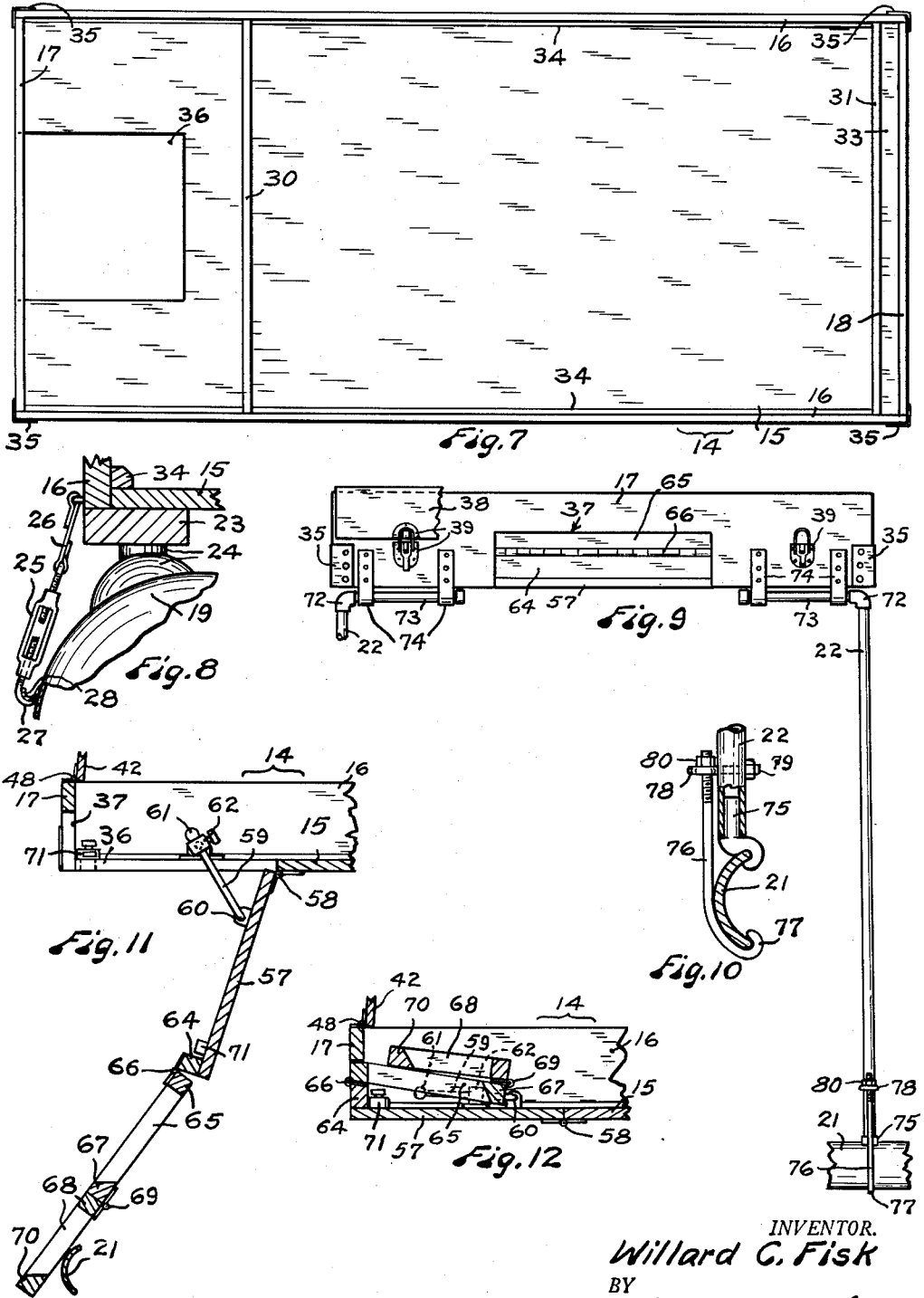

United States Patent Office 2,718,015
Patented Sept. 20, 1955

2,718,015

FOLDING PENTHOUSE FOR USE ON THE TOP OF AN AUTOMOBILE

Willard C. Fisk, Seattle, Wash.

Application November 28, 1950, Serial No. 197,982

6 Claims. (Cl. 5—119)

This invention relates to a folding automobile penthouse and an object of this invention is to provide a folding or collapsible penthouse which may be carried on top of an automobile and which contains a bed and which can be used as a sleeping compartment.

Other objects are to provide a folding penthouse which is light in weight, strong and substantial in construction, compact when folded, large and roomy when opened up and one which is substantially dustproof, weatherproof and insect-proof both when it is folded and when it is opened up.

Another object is to provide a folding penthouse which may quickly and easily be mounted on or removed from the top of an automobile and one which may quickly and easily be opened up for use as a bed compartment and quickly and easily be folded for transportation purposes.

Another object is to provide a folding penthouse for use on the top of an automobile and which is adapted to overhang the rear end portion of the automobile body and has an entrance and exit doorway opening in its bottom wall adjacent the rear end thereof and which has a downwardly opening door cooperating with said doorway opening, said door having folding steps connected therewith.

Another object of this invention is to provide a folding penthouse for use on the top of an automobile, said penthouse having a rectangular box shaped base portion and having two resilient side members hinged to the respective sides of said base portion and said resilient side members having hook shaped upper edge portions and said penthouse having folding end members positioned between the resilient side members and which are adapted to elevate the side members and engage the hook shaped edge portions thereof when said folding end members are moved from lowered to raised position.

Other objects of this invention will be apparent from the following description taken in connection with the accompanying drawings.

In the drawings Figure 1 is a somewhat diagrammatic small scale side elevation showing this folding penthouse mounted on the top of an automobile and showing the penthouse collapsed or folded.

Fig. 7 is a plan view of the main body portion of the penthouse with the folding sides and ends omitted.

Fig. 8 is a fragmentary sectional view with parts in elevation showing means for supporting the front end portion of this penthouse on an automobile top and anchoring the same to the automobile top.

Fig. 9 is a fragmentary view in rear elevation showing means for supporting the rear end portion of this penthouse from the rear bumper of an automobile.

Fig. 10 is a detached view partly in section and partly in elevation showing parts of the supporting means illustrated in Fig. 9 which attach to an automobile bumper.

Fig. 11 is a fragmentary sectional view showing combined door and step means as they may appear when in a lowered position.

Fig. 12 is a fragmentary sectional view showing the same door and step means in a folded and closed position.

Like reference numerals designate like parts throughout the several views:

Figure 1:
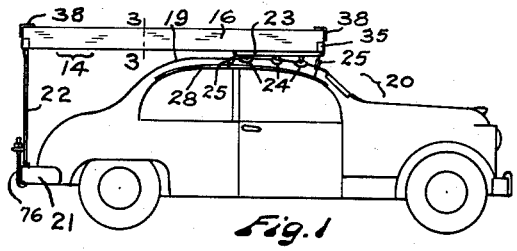

This folding penthouse includes a shallow rectangular box shaped penthouse body indicated generally by 14. This penthouse body 14 comprises a floor 15, two side walls 16, a rear end wall 17 and a front end wall 18. The penthouse body 14 is adapted to have its forward end portion supported on the top 19 of an automobile 20 and is further adapted to have its rear end portion supported from the rear bumper 21 of the automobile 20 by preferably two upright supports 22.

Figure 2:
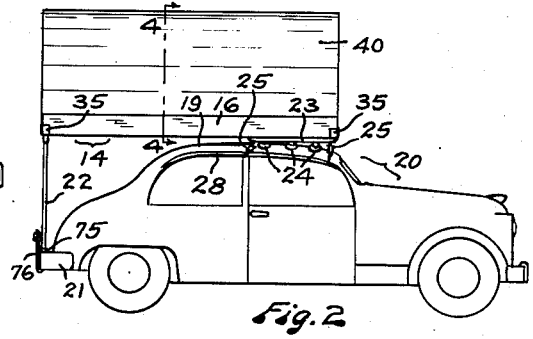
Fig. 2 is a side elevation similar to Fig. 1 showing the penthouse opened up to form a bed compartment.

Preferably reinforcing strips 23 are secured to the floor 15 of the penthouse body, Figs. 1, 2 and 8, near the forward end of such body and adjacent each side thereof. A plurality of vacuum cups of rubber or like resilient material are secured to each reinforcing strip 23 and rest on the top 19 of the automobile. The vacuum cups 24 support the weight of the forward end portion of the penthouse body and help to secure the same to the automobile top 19. Additional securing means in the form of one or more tie members is provided on each side of the penthouse body 14 near the forward end thereof to fasten the same to the car top 19. Each tie member, Fig. 8, preferably includes a turnbuckle 25 for tensioning purposes, a means 26 for connecting one end of each turnbuckle to one of the reinforcing strips 23 and another means 27, such as a hook, for connecting the other or lower end portion of each turnbuckle 25 with a gutter member 28 which extends along the side of the car top 19. The gutter member is conventional construction and is rigid with the car top.

Figure 5:
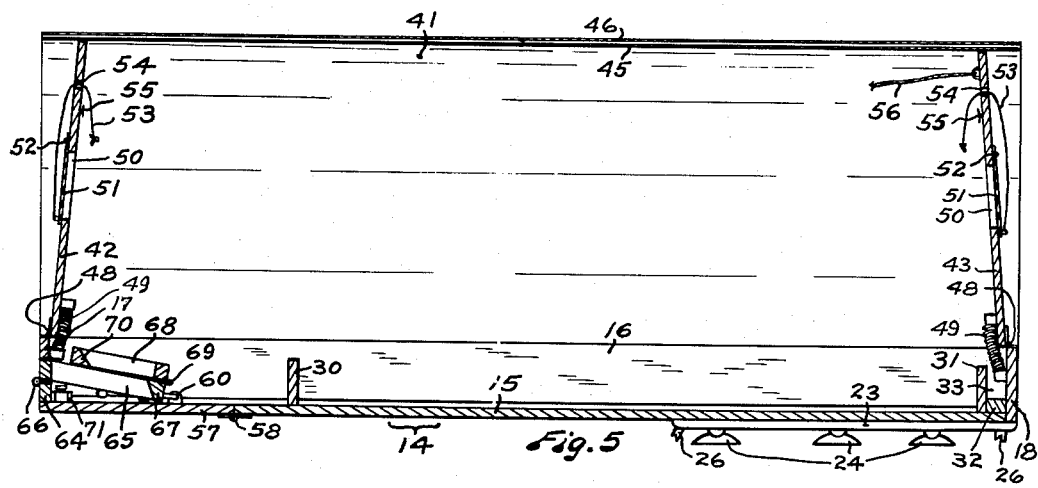
Fig. 5 is a longitudinal sectional view taken substantially on broken line 5—5 of Fig. 4.

Suitable bedding 29 may be provided in the forward end portion of the penthouse body 14. The penthouse body is longer than an ordinary bed and provision is made for entering and leaving the penthouse body through the floor 15 near the rear end of the penthouse. Preferably a rigid transverse partition member, Figs. 5 and 7, is provided in the penthouse body 14 a short distance forwardly from the rear end thereof. The member 30 serves as a footpiece for the bedding 29 and divides the penthouse body into a forward bed compartment and a rearward entrance compartment. The entrance compartment can be used for storage purposes and as a place in which persons who are using the penthouse can hang their clothes.

Another transverse partition member 31 and a reinforcing cross piece 32 are preferably provided adjacent the forward end of the penthouse body 14 and are arranged so as to provide a narrow tray 33 at the head of the bed. The partition members 30 and 31 and cross piece 32 all help to reinforce and strengthen the box shaped penthouse body 14. Preferably molding members 34 are provided in the corners of the penthouse body 14 and preferably angle shaped metal reinforcing members 35 are externally provided on the corners of said penthouse body.

The floor 15 toward the rear of the penthouse body is cut away to form a rectangular doorway 36, Fig. 7. Also the rear end wall 17 of the penthouse body is cut away to leave an opening 37, Figs. 11 and 9, which registers with the doorway 36. The openings 36 and 37 provide access to the inside of the penthouse and these openings are adapted to be closed by combined door and step means as hereinafter described.

Figure 3:
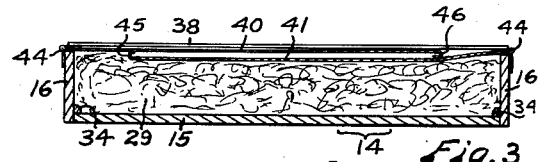
Fig. 3 is a view in cross section on a larger scale than Figs. 1 and 2 taken substantially on broken line 3—3 of Fig. 1 and showing the penthouse collapsed or folded.

Angle shaped closure members 38, Figs. 1 and 3 are provided for use at the ends of the penthouse body when all parts are in their folded position. Suitable fastener members 39 are used to secure the closure members 38 in their operative positions. The closure members 38 hold the several parts in folded position and exclude moisture and dust as hereinafter explained.

The folding walls for completing an enclosure above the penthouse body 14 comprise two side wall members 40 and 41 and two end wall members 42 and 43. The side wall members 40 and 41 are made of resilient sheet material so that they will lie substantially flat when folded and will assume an arched or bowed position when they are raised to cooperate in forming an enclosure. These side wall members 40 and 41 may be made of sheet aluminum. Each resilient side member 40 and 41 is pivotally connected, as by a piano type hinge 44 with the upper edge of one of the side walls 16 of the penthouse body.

Figure 6:
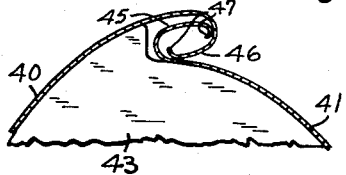
Fig. 6 is a view partly in section and partly in elevation, on a larger scale than the preceding figures, and with parts broken away, showing the construction of the apex portions of folding side and end members.

The upper edge portion of one of the resilient side wall members, such as the member 40, is bent inwardly to provide a hook 46 which preferably extends throughout the length of said member 40. The upper edge portion of the other side wall member 41 is bent outwardly to provide hook means 45 which also extends throughout the length of said member 41. The hook shaped edge portions 45 and 46 are adapted to engage with and hook into each other when the two side members 40 and 41 are in the raised position. These hook shaped edge portions 45 and 46 thus form a weatherproof and dustproof connecting means for the two side members 40 and 41 and also reinforce the outer edge portions of said members 40 and 41. Also these hook shaped edge portions 45 and 46 form a ridge-pole when the side members 40 and 41 are raised and said hook shaped edge portions are interengaged with each other. The extremities 47 of the hook shaped members 45 and 46, see Fig. 6, are inwardly bent on a smaller radius than are the other parts of these hook shaped members so that a rounded surface of each extremity 47 comes into contact with the opposed member in each instance and direct edge contact is avoided.

The end members 42 and 43 are hinged to the end walls 17 and 18 preferably by piano type hinges 48. These end members 42 and 43 are positioned inside of the resilient side members 40 and 41 and are preferably formed of substantially non-resilient material, such as plywood. Each end member 42 and 43 is shaped somewhat like a triangle with a straight base and two outwardly convex curved sides.

Figure 4:
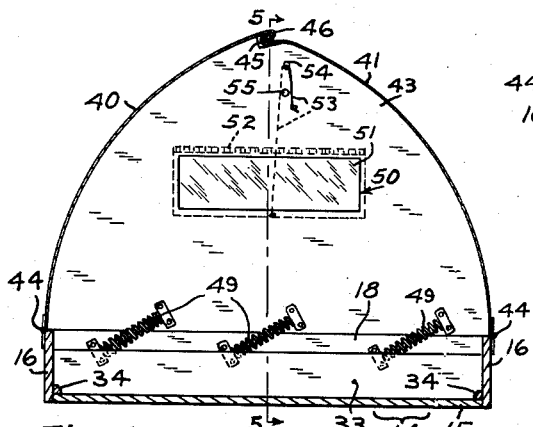
Fig. 4 is a cross sectional view taken substantially on broken line 4—4 of Fig. 2 and on a larger scale than Fig. 2, the folding sides and ends of the penthouse being in raised or opened up position.

When all of the wall members 40, 41, 42 and 43 are in a raised position, as shown in Figs. 4 and 5, the end members 42 and 43 will wedge between and press outwardly against and tension the resilient side members 40 and 41 at the locations where they engage the same and cause the hooked edge portions 45 and 46 of these resilient side members to engage with each other and be drawn tightly together and the resilient side members 40 and 41 will be bowed and caused to conform in shape to the outline of the end members 42 and 43. The outwardly convex shape imparted to the side members 40 and 41 when they are raised is thus determined by the shape of the end members 42 and 43. Preferably the end members 42 and 43 are notched adjacent their apex, as best shown in Fig. 6, to conform as nearly as possible to the shape of parts of the two side members 40 and 41 adjacent the hook shaped edges 45 and 46 of said side members.

Springs 49, Fig. 4, of a type commonly used on fire doors are connected with the folding end members 42 and 43 and with the adjacent end walls 17 and 18 so that they will yieldingly urge the end members 42 and 43 into a raised position at all times. These springs 49 are particularly useful in helping to hold all of the wall members elevated at the time the penthouse is being opened up.

Preferably a window opening 50 is provided in each of the end members 42 and 43 and a window pane 51 of transparent plastic material is hinged, as by piano type hinge means 52, to the outer side of the end member adjacent the upper edge portion of each opening 50. Preferably a cord 53 is attached to the lower edge portion of each window pane 51 and passes upwardly and inwardly through a small hole 54 in the end member 42 or 43 and is adapted to be engaged with a catch member 55 to hold the window pane in any desired adjusted position. The window pane 51 will close by gravity when the cord 53 is released and because it is on the outer side of the end wall member and is hinged at the top edge of the window opening 50 it will always exclude rain and will not be blown open by wind.

Preferably a light strong flexible cable 56, a fragment of which is shown in Fig. 5, is secured to the upper portion of the front end member 43 and extends to the rear of the penthouse so that the front end member 43 can be pulled rearwardly in folding and collapsing the penthouse.

The folding side members 40 and 41 and end members 42 and 43 are constructed and pivotally mounted in such a manner as to cause the resilient side members 40 and 41 to tighten against and conform to the curvature of the end members 42 and 43 when said end members are moved upwardly and as said end members approach a vertical position. The relative dimensions of the side and end members and the relative positioning of their hinge means 44 and 48 respectively is such as to insure that upward swinging movement of the end members 42 and 43 will be stopped, as illustrated in Fig. 5, by tightening and binding of the side members on said end members before said end members reach a vertical position. This insures tight contact between the edges of the end members 42 and 43 and the resilient side members 40 and 41. Also it insures that the hook like edge portions 45 and 46 of the resilient side members will be tightly drawn together. It further insures that the resilient side members 40 and 41 will be placed under tension, particularly at the locations where they are engaged by the end members, and the end members 43 and 42 will be placed under compression in such a manner as to insure tight weatherproof and dust proof joints and to eliminate rattling and other unpleasant noises which might result from relative movement of these parts. This further eliminates the need for stop means to limit outward swinging movement of the end members 42 and 43. The springs 49 insure that the end members 42 and 43 can not work loose and swing inwardly and thus allow inadvertent folding of the penthouse walls. Also when the side members 40 and 41 are raised in opening up the penthouse the end members 42 and 43 will follow the side members 40 and 41 upwardly and will hold them in a raised position until the person who is erecting these walls can enter the penthouse and push the end members outwardly into a fully set up position as illustrated in Fig. 5.

The entrance and exit openings 36 and 37 are adapted to be closed by a downwardly opening trap door 57 which is connected by hinges 58 with the floor 15 adjacent the forward edge of the opening 36. The door 57 is adapted to be lowered into a position as shown in Fig. 11. Preferably two door supporting rods 59 are connected by pivots 60 with the door 57 and extend upwardly through pivoted guides 62 which are mounted on the floor 15. The rods 59 have knobs 61 thereon above the guides 62 to limit downward swinging movement of the door 57.

A combined cross piece and step member 64 is rigid with the outer end portion of the door 57 and positioned on the upper side of said door. An upper step frame 65 is pivotally connected by hinge means 66 with the cross piece 64. A transverse step member 67 is provided at the lower end of the upper step frame 65 and a lower step frame 68 is connected by hinge means 69 with the step member 67. A step 70 is provided at the lower end portion of the lower step frame 68. The step frame 68 is adapted to rest against the rear bumper 21 of the car on which the penthouse is carried. Latch means 71 is provided for holding the door 57 and parts connected therewith in a closed position. Preferably this latch means can be released either from the inside or the outside of the penthouse and preferably it can be locked from the inside so that it can not be released from the outside.

Each upright support 22 at the rear end of the penthouse preferably comprises an upright piece of pipe having its upper end portion connected by an elbow fitting 72 with a shorter piece of pipe 73 which is perpendicular to the support 22. The pipe 73 is pivotally connected by hanger members 74 with the rear end portion of the penthouse body 14. This provides for self adjustment of the upright supports 22 and for the folding of these supports 22 underneath the body 14 when the penthouse is not on a car. The lower end portion of each upright support 22 is preferably connected with the bumper 21 by mechanism as shown in Fig. 10. This mechanism comprises one clamp member 75 which fits within the lower end of the upright support 22 and also fits over the upper edge portion of the bumper 21. Another clamp member 76 in the form of a bent rod or bolt has a hook portion 77 which hooks onto and engages with the lower edge of the bumper 21. The upper end portion of the clamp member 76 extends through the eye member 78 of an eye bolt 79 and has a nut 80 which may be tightened against the eye member 78. The eye bolt 79 extends transversely through the upright support 22. Tightening of nut 80 will clamp the support 22 securely to the bumper 21.

When this penthouse is folded and the L-shaped cap members 38 are in their proper position on the ends of the penthouse body the wall members 40, 41, 42 and 43 will all be secured down and a weatherproof and dust proof end closure provided.

To open up the penthouse the user removes the two end caps 38, lowers the door 57 and steps carried thereby and lifts up on the side members 40 and 41 to swing these members upwardly. The members 42 and 43 will follow the side members 40 and 41 upwardly and prevent the side members from dropping back down. Care is taken to see that the side members 40 and 41 are in contact with each other as they approach a final raised position so that the hook shaped edge portions 45 and 46 of these two members will be certain to engage with each other. The final positioning of the end members 42 and 43 is preferably accomplished by entering the penthouse and pushing these end members outwardly into substantially the positions in which they are shown in Fig. 5. This places the side members 40 and 41 under tension and the end members 42 and 43 under compression and draws the hook shaped parts 45 and 46 firmly together and causes the resilient side members 40 and 41 to lie closely against and conform to the shape of the edge portions of the end members 42 and 43.

The side and end members of the penthouse are collapsed or folded by exerting a pull on the cable 56 to pivotally move the front end member 43 rearwardly and downwardly and at the same time pushing the rear end member 42 forwardly and downwardly. This allows the side members 40 and 41 to fold by gravity on the end members 42 and 43. The step members can then be folded, the door 57 can be closed, and the cap members 38 applied to the ends of the body member 14 and folded parts.

The foregoing description and accompanying drawings clearly discloses what I now regard as a preferred embodiment of this invention but it will be understood that this disclosure is merely illustrative and that changes may be made within the scope of the following claims.

I claim:

1. In a folding penthouse, a rectangular base portion; two resilient side members hinged to the respective sides of said base portion; oppositely curved interlocking hook portions provided on the non-pivoted edges of said resilient side members; and two end members each having a straight base and two convexly curved convergent edges, said end members being hinged to the respective ends of said base portion and operating between said side members, and being swingably movable from folded positions within the base through arcs causing contact of the end members with the side members and tending to spread the side members apart, the external distance along the two convexly curved edges of each end member being slightly greater than the internal distance along the two spread apart interlocked side members measured in a direction at right angles to the conjoined non-pivoted lateral edges of said two spread apart interlocked side members, whereby a wedging engagement of the end members within the interlocked side members and a tensioning of the adjacent portions of the side members results when the end members are swingingly moved upwardly and shortly before the end members reach a position perpendicular to the base.

2. In a folding penthouse, a rectangular base portion; two resilient side members hinged to the respective sides of said base portion; oppositely curved interlocking hook portions provided on the outer edges of said resilient side members; two end members each having a straight base and two outwardly convexly curved convergent edges, said end members being hinged to the respective ends of said base portion for pivotal movement between said resilient side members, and being swingingly movable from folded positions within the base through arcs causing contact of the end members with the side members and tending to spread the side members apart, the external distance along the two convexly curved edges of each end member being slightly greater than the internal distance along the two spread apart interlocked side members measured in a direction at right angles to the conjoined outer lateral edges of said two spread apart interlocked side members, whereby a wedging engagement of the end members within the interlocked side members and a tensioning of the adjacent portions of the side members results when the end members are swingingly moved upwardly and shortly before the end members reach a position perpendicular to the base; and springs urging said end members into a raised position.

3. In a folding penthouse, a rectangular base portion having a floor and side and end walls; two resilient side members hinged to the respective sides of said base portion; oppositely curved interlocking hook portions provided on the outer edges of said resilient side members; two substantially rigid end members each having a straight base and two outwardly curved convergent edges, said end members being hinged to the respective ends of said base portion for pivotal movement between said resilient side members and being swingingly movable from folded positions within the base through arcs causing contact of the end members with the side members and tending to spread the side members apart, the external distance along the two convexly curved edges of each end member being slightly greater than the internal distance along the two spread apart interlocked side members measured in a direction at right angles to the conjoined outer lateral edges of said two spread apart interlocked side members, whereby a wedging engagement of the end members within the two interlocked side members and a tensioning of the adjacent portions of the side members results when the end members are swingingly moved upwardly and shortly before the end members reach a position perpendicular to the base; and door means in the bottom of said base portion providing access to the space enclosed between said side and end walls when said walls are raised.

4. In a folding penthouse of the class described, a rectangular base member having a floor and side and end walls; two resilient side members hinged to the respective sides of said base member; interlocking hook means provided on the outer edge portions of said resilient side members; two substantially rigid end members, each having a straight base and two outwardly curved convergent edges, said end members being hinged to the respective ends of said base member for pivotal movement between said resilient side members, the relative dimensions and pivoting of the side members and end members providing for the binding of the side members on the end members when the end members are moved upwardly and shortly before the end members reach positions in which they would be perpendicular to the floor of the base member with a resultant stopping of the outward movement of the end members and tensioning of the engaged portions of the side members and drawing together of the hook means on the edges of the side members; and spring means urging said end members into a raised position.

5. In a folding penthouse for use on the top of an automobile, a base portion having a floor and having two oppositely disposed side walls and a front wall and a rear wall; collapsible compartment forming means carried by said base portion adapted to be raised to form sides and ends of a compartment above said base portion; a doorway in said floor at the rear end of said base portion; another doorway in said rear wall extending from the lower edge of said rear wall upwardly and registering with the doorway in said floor, said two doorways cooperating to form an entrance and an exit opening to the compartment formed by said base and said collapsible compartment forming means; a door hinged to said floor at the forward extremity of the doorway in said floor, said door closing the doorway in said floor and swinging downwardly into an open position; and folding step means carried by the outer end portion of said door, said folding step means forming a door to close the doorway in said rear wall when the door is in a closed position.

6. In a folding penthouse for use on the top of an automobile, a relatively long base portion having a floor and side and end walls; folding means operable to form an enclosure above said base portion; a doorway in the floor of said base portion adjacent the rear end thereof; a door pivotally connected with said base portion for downward swinging movement and closing said doorway when in a raised position; and folding steps pivotally connected with said door, said steps being adjacent the upper side of said door when they are folded and the door is closed and being extending downwardly approximately in prolongation of said door when said door is in a downwardly extending open position.

References Cited in the file of this patent

UNITED STATES PATENTS

| | | |
|---|---|---|
| 446,164 | Doelle | Feb. 10, 1891 |
| 1,984,681 | Jackson | Dec. 18, 1934 |
| 2,183,111 | Tesmer | Dec. 12, 1939 |
| 2,186,584 | Halverson | Jan. 9, 1940 |
| 2,291,900 | Jimmes | Aug. 4, 1942 |
| 2,531,678 | Gledhill | Nov. 28, 1950 |
| 2,561,168 | Beckley | July 17, 1951 |